United States Patent [19]

Blount

[11] 4,351,919

[45] Sep. 28, 1982

[54] PROCESS FOR THE PRODUCTION OF POLYESTER SILICATE RESINOUS PRODUCTS

[76] Inventor: David H. Blount, 5450 Lea St., San Diego, Calif. 92105

[21] Appl. No.: 310,370

[22] Filed: Oct. 13, 1981

Related U.S. Application Data

[63] Continuation-in-part of Ser. No. 256,317, Apr. 22, 1981, which is a continuation-in-part of Ser. No. 122,015, Feb. 19, 1980, which is a continuation-in-part of Ser. No. 10,061, Feb. 7, 1979, Pat. No. 4,200,697, which is a continuation-in-part of Ser. No. 794,915, May 9, 1977, Pat. No. 4,125,498, which is a continuation-in-part of Ser. No. 653,727, Jan. 30, 1976, abandoned, which is a continuation-in-part of Ser. No. 562,201, Apr. 14, 1975, abandoned.

[51] Int. Cl.³ .............................................. C08L 83/00
[52] U.S. Cl. .................................... 524/858; 524/868; 525/17; 525/27; 525/43; 525/44; 525/48
[58] Field of Search ................. 524/858, 868; 525/17, 525/27, 43, 44, 48

[56] References Cited

U.S. PATENT DOCUMENTS 4,125,498 11/1978 Blount .................................. 528/14
4,200,697 4/1980 Blount .................................. 521/83

Primary Examiner—Melvyn I. Marquis

[57] ABSTRACT

Polyester silicate resinous products are produced by chemically reacting an organosol containing organic polyhydroxy compounds with an organic polycarboxylic acid and/or polycarboxylic acid anhydride. An excess of oxidated silicon compound may be used in this process. The unsaturated polyester silicate resinous products may be used to produce building panels, boats, furniture, etc.

16 Claims, No Drawings

PROCESS FOR THE PRODUCTION OF POLYESTER SILICATE RESINOUS PRODUCTS

CROSS-REFERENCE TO RELATED COPENDING APPLICATIONS

This application is a continuation-in-part of U.S. Patent Application, Ser. No. 256,317, filed on Apr. 22, 1981, which is a continuation-in-part of U.S. Patent Application, Ser. No. 122,015, filed on Feb. 19, 1980, which is a continuation-in-part of U.S. Patent Application, Ser. No. 010,061, filed on Feb. 7, 1979, now U.S. Pat. No. 4,700,697 which is a continuation-in-part of U.S. Patent Application, Ser. No. 794,915, filed on May 9, 1977, now U.S. Pat. No. 4,125,498, which is a continuation-in-part of U.S. Patent Application, Ser. No. 653,727, filed on Jan. 30, 1976, now abandoned, which is a continuation-in-part of U.S. Patent Application, Ser. No. 562,201, filed on Apr. 14, 1975, now abandoned.

BACKGROUND OF THE INVENTION

This invention relates to a process for the production of polyester silicate resinous products containing an excess amount of oxidated silicon compound by chemically reacting organosol containing an organic polyhydroxy compound with a polycarboxylic acid and or a polycarboxylic acid anhydride by heating the mixture. An unsaturated polycarboxylic acid, polycarboxylic acid anhydride or organic polyhydroxylic compound must be present in the reactive mixture when an unsaturated polyester silicate resinous product is desired.

The polyester silicate resinous products may be utilized as protective coatings for wood, metal, plastics, linoleum, leather, fabrics and rubber. They may be utilized in paints, lacquers, metal primers, caulking compounds and water-emulsion paints. The unsaturated polyester silicate resinous products, when copolymerized with a vinyl monomer, will produce hard, solid, useful objects or they may be used in conjunction with a reinforcing filler such as fiberglas fibers, paper or cloth to produce a laminate of outstanding strength and durability. They may also be used as a molding powder, as an adhesive and as impregnants. The use of an excess amount of oxidated silicon compound greatly increases the strength of the cured product. These resinous products may be further reacted with epihalohydrin and polyisocyanate compounds to produce resinous products and foams.

This process is an improvement over U.S. Pat. No. 4,125,498 by utilizing oxidated silicon in the form of very fine particle size, approximately 5 to 10 microns. Utilization of these fine particles improves the manufacturing process by preventing precipitation of oxidated silicon particle, thereby giving an even distribution of the excess unreacted oxidated silicon particles, greatly strengthening the final cured product. Suitable alkali catalyst may be utilized, but satisfactory polyester silicate resinous products may be produced without the alkali catalyst.

Polyester silicate resinous products may be modified with vegetable oils, vinyl monomers, aminoplasts, phenoplast, phenol, melamine, silicone silicate, silicone resins, cellulose nitrate, polyisocyantes, cyclopentadienes, terpenes, monobasic acids, e.g., benzoic and p-tert-butyl benzoic acid, modified natural resins, ethyl cellulose, chlorinated rubber, phenolic resins, aldehyde phenol silicate resins and other synthetic and modified natural resins. The useful vinyl monomers include styrene, acrylates, methacrylates, acrylonitriles and mixtures thereof.

Polyester silicate resinous products containing reinforcing fine particles of oxidated silicon compounds may be produced by reacting the following components:

(a) an organosol containing organic polyhydroxy compounds;
(b) a polycarboxylic acid and/or a polycarboxylic acid anhydride.

Component (a)

The production of organosols is commonly known in the arts. Organosols are produced by mixing a silica sol with an organic compound, then heating the mixture, preferably under reduced pressure, until the water is removed. The production of silica sols is commonly known in the arts. Silica sols are generally produced by utilizing a dilute sodium silicate solution (water-glas). The pH of the dilute waterglass solution is reduced to about a pH of 2 by an ionic exchange system, then after the particle size has grown to the desired size, the pH is raised to about 8 by the addition of sodium hydroxide and water is removed by evaporation until the solution has the desired $SiO_2$ content, usually 10% to 15% by weight.

The methods of making silica sols are illustrated on pages 331 to 364 and the making of organosols is illustrated on pages 412 to 414 of "The Chemistry of Silica" by Ralph K. Iler, published by John Wiley and Sons, New York, N.Y.

The organosols may contain other organic compounds or resins, but must contain an organic polyhydroxy compound.

Any suitable polyhydric alcohol may be used in the production of organosols such as, for example, ethylene glycol; propylene-1,2- and -1,3-glycol; butylene-1,4- and -2,3-glycol; hexane-1,6-diol; octane-1,8-diol; neopentyl glycol, cyclohexanedimethanol(1,4-bis-hydroxymethylcyclohexane); 2-methylpropane-1,3-diol; glycerol; trimethylol propane; hexane-1,2,6-triol; butane-1,2,4-triol; trimethylol ethane; pentaerythritol; quinitol; mannitol and sorbitol; methylglycoside; diethylene glycol; triethylene glycol; tetraethylene glycol; polyethylene glycols; dipropylene glycol; polypropylene glycols; dibutylene glycol and polybutylene glycols. The polyesters may also contain a proportion of carboxyl end groups. Polyesters of lactones, such as c-caprolactone, or hydroxycarboxylic acid such as ω-hydroxycaproic acid, may also be used.

The polyethers with at least 2, generally from 2 to 8 and preferably 2 or 3, hydroxyl groups used according to the invention are known and may be prepared, e.g., by the polymerization of epoxides, e.g., ethylene oxide, propylene oxide, butylene oxide, tetrahydrofurane oxide, styrene oxide or epichlorohydrin, each with itself, e.g., in the presence of $BF_3$, or by addition of these epoxides, optionally as mixtures or successively, to starting components which contain reactive hydrogen atoms such as alcohols or amines, e.g., water, ethylene glycol; propylene-1,3- or -1,2-glycol; trimethylol propane; 4,4-dihydroxydiphenylpropane; aniline, ammonia, ethanolamine or ethylenediamine; sucrose polyethers such as those described, e.g., in German Auslegeschriften Nos. 1,176,358 and 1,064,938 may also be used according to the invention. It is frequently preferred to use polyethers which contain predominantly primarily OH groups (up to 90% by weight, based on the total OH groups contained in the polyether). Polyethers modified with vinyl polymers such as those which may be obtained by polymerizing styrene or acrylonitrites in the presence of polyethers (U.S. Pat. Nos. 3,383,351; 3,304,273; 3,523,093 and 3,110,695; and German Pat. No. 1,152,536) and polybutadienes which contain OH groups are also suitable.

By "polythioethers" are meant, in particular, the condensation products of thiodiglycol with itself and/or with other glycols, dicarboxylic acids, formaldehyde, aminocarboxylic acids or amino alcohols. The products obtained are polythiomixed ethers or polythioether ester amides, depending on the co-component.

The polyacetals used may be, for example, the compounds which may be obtained from glycols, 4,4'-dihydroxydiphenylmethane, hexanediol, and formaldehyde. Polyacetals suitable for the invention may also be prepared by the polymerization of cyclic acetals.

The polycarbonates with hydroxyl groups used may be of the kind, e.g., which may be prepared by reaction diols, e.g., propane-1,3-diol; butane-1,4-diol; and/or hexane-1,6-diol or diethylene glycol, triethylene glycol or tetraethylene glycol, with diarylcarbonates, e.g., diphenylcarbonates or phosgene.

The polyester amides and polyamides include, e.g., the predominantly linear condensates obtained from polyvalent saturated and unsaturated carboxylic acids or their anhydrides, any polyvalent saturated or unsaturated amino alcohols, diamines, polyamines and mixtures thereof.

Polyhydroxyl compounds which contain urethane or urea groups, modified or unmodified natural polyols, e.g., castor oil, carbohydrates and starches, may also be used. Additional products of alkylene oxides with phenol formaldehyde resins or with ureaformaldehyde resins are also suitable for the purpose of the invention.

Polyhydric alcohols of lower molecular weight are preferred, such as ethylene glycol, diethylene glycol and propylene glycol.

Component (b)

Suitable dibasic acids may be aliphatic, cycloaliphatic, aromatic and/or heterocyclic and may be substituted, e.g., with halogen atoms. Examples of the dibasic acid and corresponding acid anhydride include, but are not limited to, succinic acid, adipic acid, suberic acid, azelaic acid, phthalic acid, sebacic acid, isophthalic acid, trimellitic acid, phthalic acid anhydride, tetrahydrophthalic acid anhydride, hexahydrophthalic acid anhydride, endomethylene tetrahydrophthalic acid anhydride, glutaric acid anhydride, maleic acid, maleic acid anhydride, fumaric acid, dimeric and trimeric fatty acids such as oleic acid, optionally mixed with monomeric fatty acids, dimethylterephthalate and bis-glycol terephthalate. An unsaturated dibasic acid such as maleic acid, maleic acid anhydride, fumaric acid, itaconic acid or mixtures thereof must be included in the production of unsaturated alkali metal polyester silicate resins, except when an unsaturated alcohol is used.

A portion, up to 50% by weight, of the polycarboxylic acid and/or polycarboxylic acid anhydride may be replaced by polymerable oils such as unsaturated fatty acids (or their esters), tung oil, linseed oil, heated linseed oil, soybean oil, dehydrated castor oil, tall oil, cottonseed oil, sunflower oil, fish oil, perilla oil, safflower oil and mixtures thereof.

A portion, up to 50% by weight, of the polycarboxylic acid and/or polycarboxylic acid anhydride may be replaced with a linear organic carbonate selected from the group consisting of p-xylene glycol bis(ethyl carbonate), diethylene glycol bis(allyl carbonate) and mixtures thereof.

A portion, up to 50% by weight, of the substituted organic monohydroxy compound and polycarboxylic acid is replaced with an organic compound containing hydroxyl and carboxylic radicals, selected from the group consisting of 10-hydroxy undecanoic acid; 2-hydroxy decanoic acid; ω-hydroxy pentadecanoic acid and mixtures thereof.

Any suitable polymerizing monomer may be used with the unsaturated polyester resin such as, but not limited to, vinyl monomers, allyl esters, triallyl cyanurate and mixtures thereof.

Styrene is the preferred polymerizing monomer and may be used alone or in combination with vinyl acetate. Other vinyl monomers may be used such as acrylic acid compounds and esters, vinyl toluene, divinyl benzene, acrylonitrile, methacrylonitrile, etc. The vinyl monomer may be added in an amount of 20 to 50 percent by weight, percentage based on the weight of the polyester silicate resinous product.

Activators and promoters, used in conjunction with the initiators such as cobalt which, in the form of its ethyl hexanoate or naphthenate salt, is a good, general-purpose activator for use with ketone peroxides, may be added to the unsaturated polyester resin. Concentration as low as 30 ppm of cobalt metal will activate a system. Other activators may be added to the unsaturated polyester resins such as tertiary dialkyl aryl amines, e.g., diethyl aniline, and aliphatic thiols, e.g., lauryl mercaptan, when acyl peroxides are used. When alkali metal or ammonium persulfates are used, ferric sulfate and cupric sulfate may be added to the unsaturated polyester resin.

An inhibitor, such as p-tert-butyl catechol, hydroquinone, p-nitrose dimethylaniline or similar compounds which will increase the lifetime of the unsaturated polyester resin, may be added to the unsaturated polyester resin.

Any suitable initiator which will promote the copolymerization of a solution of an unsaturated linear polymer in a liquid monomer may be used in this invention. The controlled polymerization of unsaturated polyester-monomer mixture, in order to yield fully cured solids, usually requires the use of an initiator.

Any suitable free-radical initiator, such as organic and inorganic peroxides, azo compounds, alkali metal persulfates, ammonium persulfate and mixtures thereof, may be used. The fact that the action of organic peroxide can be modified by activators and promoters, plus their ready availability at reasonable cost, makes them preferable in this invention. Thermal and photopolymerization may be used in certain cases.

Suitable organic peroxide initiators include, but are not limited to, acetyl benzoyl peroxide, peracetic acid, methyl ethyl ketone peroxide, cyclohexanone peroxide, cyclohexyl hydroperoxide, 2,4-dichlorobenzyl peroxide, cumene hydroperoxide, tert-butyl hypoperoxide, methyl amyl ketone peroxide, lauroyl peroxide, benzoyl peroxide, tert-butyl perbenzoate, di-tertbutyl diperphthalate and mixtures thereof. The amount of organic peroxide needed to promote the catalytic reaction is quite varied; usually less than 1%, based on the weight of the reactants, is needed. Methyl ethyl ketone peroxide is added in an amount of 0.2 to 0.1% by weight, based on the polyester silicate resinous product.

Promoters used with acyl peroxide include tertiary dialkyl aryl amines, such as diethyl aniline, and aliphatic thiols like, for example, lauryl mercaptan. Concentrations used are most often in the range of 0.05% to 0.5% of active substance. Promoters usually are strong reducing agents and initiators are strong oxidizing agents.

Suitable alkali metal persulfates include potassium and sodium persulfate. Redox systems may also be utilized in this invention (activation of initiators by a reducing agent).

The object of the present invention is to provide an improved process to produce polyester silicate resinous products. Another object is to produce unsaturated polyester silicate resinous products which will react with a vinyl monomer in the presence of a polymerization initiator to produce cured solid polyester silicate resins. Another object is to produce oilmodified polyester silicate resinous products which may be used as a coating agent. Another object is to produce vinyl monomermodified polyester silicate resinous products.

DETAILED DESCRIPTION OF THE INVENTION

The use of organosols containing fine particles of hydrated silica and organic polyhydroxyl compound improves the process for the production of polyester silicate resinous product. The preferred method for producing polyester silicate resinous products is to add 10 to 30 parts by weight of an organosol (produced from a silica sol free of salt and containing fine silicic acid particles which have been dehydrated in an organic polyhydroxy compound to produce a clear organosol) to from 10 to 30 parts by weight of a polycarboxylic compound, then heat the mixture while agitating at a temperature between 150° C. and 250° C. for from 30 minutes to 4 hours or until the desired viscosity or acid number is reached.

The reactions of this invention may take place under any suitable physical conditions. While most of the reactions will take place at ambient pressure, in certain cases, a pressure which is either lower than, or above, ambient pressure may give better results. It may be preferable in certain cases to use temperatures above the components' boiling temperature, after a partial reaction has taken place, in order to speed up the chemical reaction. The temperature usually ranges between 150° C. and 250° C., but may be higher.

The preferred method to produce an unsaturated polyester resinous product is to mix 10 to 30 parts by weight of an organosol containing organic polyhydroxy compounds, preferably dihydric organic compounds, and 10 to 30 parts by weight of a polycarboxylic acid and/or polycarboxylic acid anhydride, with one of them being unsaturated, then heating the mixture while agitating at from 150° C. to 250° C. for from 30 minutes to 4 hours, thereby producing an unsaturated polyester silicate resinous product. The heated unsaturated polyester silicate resinous product is then added to a vinyl monomer (the vinyl monomers used in an amount of 20 to 50 percent by weight, based on the weight of the polyester silicate resinous product), thereby producing a liquid unsaturated polyester silicate resinous product. The liquid unsaturated polyester silicate resinous product may be cured with a polymerizing initiator such as a peroxide initiator; activators and promoters may be used with the initiator.

The polyester silicate resinous product may be modified with a vegetable oil by replacing up to 50% by weight of the polycarboxylic acid and/or polycarboxylic acid anhydride, then reacting the mixture with an organosol containing dihydric organic compound to produce an oil-modified polyester silicate resinous product.

The polyester silicate resinous product may be modified with a vinyl monomer selected from the group consisting of styrene, acrylates, methacrylates, acrylonitrile and mixtures thereof in an amount up to 50% by weight of the polyester silicate resinous product.

The polyester silicate resinous product may be modified with a linear organic carbonate selected from the group consisting of p-xylene glycol bis(ethyl carbonate), diethylene glycol bis(allyl carbonate), and mixtures thereof, in an amount wherein up to 50% by weight of the polycarboxylic acid and/or polycarboxylic acid anhydride is replaced with a linear organic carbonate.

An organic compound containing hydroxyl and carboxylic radicals may be used to replace up to 50% by weight of the organic polyhydroxy compound, polycarboxylic acid or polycarboxylic acid anhydride.

DESCRIPTION OF PREFERRED EMBODIMENT

My invention will be illustrated in greater detail by the specific examples that follow, it being understood that these preferred embodiments are illustrative of, but not limited to, procedures which may be used in the production of polyester silicate resinous products. Parts and percentages are by weight unless otherwise indicated.

EXAMPLE 1

About 100 parts by weight of a silica sol containing about 10% silica by weight with a particle size about 10 micron and a pH of 8, which had been passed through an ion exchange resin to remove the sodium chloride, was mixed with 20 parts by weight of ethylene glycol. The water was removed by heating the mixture under reduced pressure, thereby producing an organosol containing about 33% silica; about 10 parts by weight of maleic anhydride, 5 parts by weight of phthalic anhydride and 10 parts by weight of adipic acid are mixed with the organosol and heated to just below the boiling temperature of ethylene glycol. The temperature is gradually elevated to about 220° C. while agitating for from 30 minutes to 4 hours until the desirable viscosity or acid number of about 50 is achieved, thereby producing a polyester silicate resinous product which also contains oxidated silicon filler.

EXAMPLE 2

About 20 parts by weight of the polyester silicate resinous product as produced in Example 1, while at about 90° C., are mixed with 7 parts by weight of styrene, thereby producing a liquid unsaturated polyester silicate resinous product.

EXAMPLE 3

About 25 to 100 ppm of cobalt, in the form of cobalt naphthanate, are added to, and mixed with, 20 parts by weight of the liquid unsaturated polyester silicate resinous product as produced in Example 2; then 0.2 to 0.5 percent by weight, percentage based on weight of polyester silicate resinous product, is added and mixed with the liquid unsaturated polyester silicate resinous product. The resin is then applied to multiple layers of fiberglas and cures in from 30 minutes to 2 hours, thereby producing a polyester silicate panel which may be used in construction, boats, aircraft, etc.

EXAMPLE 4

About 1000 parts by weight of a silica sol containing about 15% oxidated silicon compound, 75 parts by weight of ethylene and 100 parts by weight of glycerol are mixed, then heated under reduced pressure while agitating until all of the water has been removed. To this mixture, 100 parts by weight of phthalic anhydride, 50 parts by weight of adipic acid and 20 parts by weight of xylene are added to assist in removal of the water; then the mixture is heated to 150° C. while agitating in a reactor which has a system to trap the evaporated water and return the xylene to the reactor. The temperature is slowly increased up to 250° C. The mixture is heated for 30 minutes to 4 hours until the desired viscosity or acid number is obtained; the xylene is removed by evaporation, thereby producing a solid polyester silicate resin with oxidated silicon compound as a filler.

This polyester silicate resin may be molded by heat and pressure to produce useful objects such as knobs, panels, art objects, etc.

EXAMPLE 5

About 1000 parts by weight of a silica sol which is free of salt and contains about 12% oxidated silicon compound which has a very small particle size are mixed with 75 parts by weight of glycerol, 50 parts by weight of propylene glycol and 50 parts by weight of ethylene glycol, then heated under reduced pressure while agitating until all of the water has been removed, thereby producing a liquid organosol. To this organosol, 100 parts by weight of phthalic anhydride, 50 parts by weight of maleic anhydride, 100 parts by weight of linseed oil and 50 parts by weight of xylene are mixed, then heated in a reactor with a reflux condenser (water is removed by azeotropic distillation) at about 150° C. while agitating. As the reaction proceeds, the temperature is gradually increased to up to 250° C. until the desired viscosity is obtained, but before gelation, thereby producing an oil-modified polyester silicate resinous product.

The hot oil-modified polyester silicate resinous product may be run into a tank of organic solvent to form a solution, then color pigments, driers, etc., are added and the solution is used as a coating on wood, metal, plastic, etc.

Other oils may be used in place of linseed oil such as soya bean oil, tung oil, dehydrated castor oil, cottonseed oil, tall oil, perilla oil, oiticica oil, sunflower oil, safflower oil, walnut oil and mixtures thereof.

Other polyhydric alcohols may be used in place of glycerol or with glycerol, such as pentaerythritol, di- and tripentaerythritol, trimethylol ethane and propane, sorbitol, mannitol and mixtures thereof.

EXAMPLE 6

About 1000 parts by weight of a salt-free silica sol containing 15% silicic acid in the form of very fine particles are mixed with 75 parts by weight of glycerol, 50 parts by weight of trimethylol ethane and 50 parts by weight of propylene glycol, then heated under reduced pressure while agitating until all of the water is removed, thereby producing an organosol. The organosol is then mixed with 50 parts by weight of styrene monomer, 100 parts by weight of phthalic anhydride, 30 parts by weight of isophthalic acid, 20 parts by weight of adipic acid and 50 parts by weight of fumeric acid are mixed and heated to just below the boiling point of the reactants, the temperature is then gradually increased to 250° C. while agitating for from 30 minutes to 4 hours, thereby producing a vinyl-modified polyester silicate resinous product.

Other vinyl monomers may be used in place of, or with, styrene such as acrylates, methacrylates, acrylonitrile and mixtures thereof. Polymerization initiators such as peroxides may also be added when desired.

EXAMPLE 7

About 500 parts by weight of an organosol containing about 40% of ethylene glycol, 15% of diethylene glycol and 45% of $SiO_2$ are mixed with 175 parts by weight of maleic anhydride, 150 parts by weight of adipic acid and 75 parts by weight of phthalic anhydride, then heated to 150° C. while agitating and gradually increasing the temperature to 250° C. for from 30 minutes to 4 hours or until the desired viscosity or acid number is obtained, thereby producing an unsaturated polyester silicate resinous product containing silicic acid.

This resinous product, while still warm, is mixed with about 250 parts by weight of styrene containing an inhibitor such as hydroquinone, thereby producing a liquid unsaturated polyester silicate resinous product.

The resinous product is cured by adding an initiator such as benzoyl peroxide and a promoter such as cobalt naphthanate if desired.

Other vinyl monomers may be used in place of, or with, styrene such as vinyl acetate, vinyl toluenes, acrylates, methacrylates, and mixtures thereof. Allyl compounds such as triallyl cyanurate may be used in place of, or with, vinyl monomers.

EXAMPLE 8

Example 7 is modified wherein about 50% by weight of the phthalic anhydride is replaced with diethylene glycol bis(allyl carbonate).

EXAMPLE 9

Sample 7 is modified wherein about 50% by weight of the maleic anhydride is replaced with 10-hydroxy undecanoic acid.

EXAMPLE 10

An organosol containing 3 mols of hydrated silica and 1 mol of glycerol is mixed with 1 mol of phthalic anhydride, then heated while agitating to 150° C. The temperature is gradually elevated to about 250° C. over a period of from 30 minutes to 4 hours until the desired viscosity or acid number is obtained, thereby producing a polyester silicate resinous product also containing hydrated silica as a reinforcing filler.

I claim:

1. An improved process for the production of polyester silicate resinous products containing fine oxidated silicon particles very fine particle size, approximately 5 to 10 microns which comprises mixing and reacting the following components:
   (a) organosol containing an organic polyhydroxy compound, 10 to 30 parts by weight;
   (b) a polycarboxylic compound selected from the group consisting of polycarboxylic acids, polycarboxylic acid anhydrides and mixtures thereof, 10 to 30 parts by weight.

2. The process of claim 1 wherein the organic polyhydroxy compound is selected from the group consisting of ethylene glycol, propylene glycol, butylene glycol, trimethylene glycol, tetramethylene glycol, pentamethylene glycol, hexamethylene glycol, diethylene glycol, polyethylene glycol, polypropylene glycol, bis(β-hydroxyethyl) terephthate, Bisphenol A, resorcinol, glycerol, glycerol monochlorohydrin, trimethylol ethane, carbohydrates and mixtures thereof.

3. The process of claim 1 where the polycarboxylic acid is selected from the group consisting of maleic acid, phthalic acid, succinic acid, oxalic acid, malonic acid, glutaric acid, adipic acid, pimelic acid, suberic acid, isophthalic acid, fumeric acid, azelaic acid, sebacic acid, terephthalic acid, itaconic acid, diglycolic acid, tartaric acid and mixtures thereof.

4. The process of claim 1 wherein the polycarboxylic acid anhydride is selected from the group consisting of phthalic acid anhydride, maleic acid anhydride, succinic acid anhydride, glutaric acid anhydride, poly(adipic anhydride), tetrachlorophthalic acid anhydride, pyromellitic acid anhydride, tetrahydrophthalic acid anhydride, dodecenylsuccinic acid anhydride, hexadecylsuccinic acid anhydride, nitrophthalic acid anhydride and mixtures thereof.

5. The process of claim 1 wherein up to 50% by weight of the polycarboxylic acid and/or polycarboxylic acid anhydride is replaced with a vegetable oil selected from the group consisting of soybean oil, linseed oil, cottonseed oil, tung oil, fish oil, perilla oil, oiticica oil, sunflower oil, safflower oil, walnut oil, dehydrated castor oil, monoglyceride of vegetable oils and mixtures thereof.

6. The process of claim 1 wherein up to 50% by weight of the polycarboxylic acid and/or polycarboxylic acid anhydride is replaced with a linear organic carbonate selected from the group consisting of p-xylene glycol bis(ethyl carbonate); diethylene glycol bis(allyl carbonate) and mixtures thereof.

7. The process of claim 1 wherein up to 50% by weight of the organic polyhydroxyl compound, polycarboxylic acid or polycarboxylic acid anhydride is replaced with an organic compound containing hydroxyl and carboxylic radicals, selected from the group consisting of 10-hydroxy undecanoic acid, 2-hydroxy decanoic acid, ω-hydroxy pentadecanoic acid and mixtures thereof.

8. The process of claim 1 wherein the polyester silicate resinous product produced contains an unsaturated polycarboxylic acid, polycarboxylic acid anhydride or polyhydroxyl compound and an additional step is taken wherein a vinyl monomer, selected from the group consisting of vinyl acetate, styrene, methacrylic acid, vinyl toluene, acrylic acid, acrylonitrile, divinyl benzene and mixtures thereof, in the amount of 20 to 50 percent by weight, percentage based on the polyester silicate resinous product, is admixed with the polyester silicate resin, then a catalytic amount of a peroxide initiator and activater is added and then thoroughly mixed and reacted.

9. The process of claim 8 wherein the peroxide initiator is selected from the group consisting of acetyl benzoyl peroxide, peracetic acid, methyl ethyl ketone peroxide, cyclohexanone peroxide, cyclohexyl hypoperoxide, 2,4-dichlorobenzoyl peroxide, cumene hypoperoxide, tert-butyl hydroperoxide, methyl anyl ketone peroxide, lauroyl peroxide, benzoyl peroxide, tert-butyl perbenzoate, di-tert-butyl diperphthalate, p-chlorobenzoyl peroxide, dibenzoyl diperoxide, and mixtures thereof.

10. The process of claim 8 wherein the peroxide initiator is methyl ethyl ketone peroxide in the amount of 0.2 to 0.5 percent by weight, percentage based on the weight of the polyester silicate resinous product, and the activator is cobalt naphthanate in the amount of 30 to 100 ppm of cobalt metal.

11. The product produced by the process of claim 1.
12. The product produced by the process of claim 5.
13. The product produced by the process of claim 6.
14. The product produced by the process of claim 7.
15. The product produced by the process of claim 8.
16. The process of claim 1 wherein a vinyl monomer is added to the polyester silicate resinous product and is selected from the group consisting of styrene, acrylates, methacrylates, acrylonitrile, and mixtures thereof, in an amount up to 50 percent by weight of the polyester silicate resinous product.

* * * * *